US012698170B2

(12) United States Patent
Umeda et al.

(10) Patent No.: US 12,698,170 B2
(45) Date of Patent: Aug. 4, 2026

(54) PRINTING DEVICE

(71) Applicant: SEIKO EPSON CORPORATION, Tokyo (JP)

(72) Inventors: Takanori Umeda, Shiojiri (JP); Keisuke Yamaya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 18/596,918

(22) Filed: Mar. 6, 2024

(65) Prior Publication Data

US 2024/0300758 A1 Sep. 12, 2024

(30) Foreign Application Priority Data

Mar. 9, 2023 (JP) ................................ 2023-036130

(51) Int. Cl.

| | |
|---|---|
| ***B65H 3/06*** | (2006.01) |
| ***B41J 13/10*** | (2006.01) |
| ***B65H 3/52*** | (2006.01) |
| ***B65H 5/06*** | (2006.01) |
| *B41J 13/03* | (2006.01) |

(52) U.S. Cl.

CPC .............. *B65H 3/06* (2013.01); *B41J 13/103* (2013.01); *B65H 3/5223* (2013.01); *B65H 5/062* (2013.01)

(58) Field of Classification Search

CPC ...... B65H 3/5223; B65H 3/5215; B65H 3/34; B65H 3/60; B65H 3/06; B65H 3/0684

See application file for complete search history.

(56) References Cited

U.S. PATENT DOCUMENTS

| | | | | |
|---|---|---|---|---|
| 7,798,483 | B2 * | 9/2010 | Oomori | B41J 13/103 271/118 |
| 7,918,446 | B2 * | 4/2011 | Yanagishita | B65H 3/0684 271/124 |
| 8,141,866 | B2 * | 3/2012 | Okawa | B65H 3/56 271/167 |
| 8,662,494 | B2 * | 3/2014 | Shirane | B65H 1/266 271/167 |
| 8,714,548 | B2 * | 5/2014 | Horade | B65H 85/00 271/265.02 |
| 10,118,782 | B2 * | 11/2018 | Wakakusa | B41J 11/006 |
| 10,183,821 | B2 * | 1/2019 | Oshiro | B65H 1/266 |

(Continued)

FOREIGN PATENT DOCUMENTS

JP 2021-130286 A 9/2021

*Primary Examiner* — Patrick Cicchino

(74) *Attorney, Agent, or Firm* — WORKMAN NYDEGGER

(57) ABSTRACT

A printing device includes a placement unit on which a plurality of media are stackable, a printing unit, and a feed roller that feeds the medium placed on the placement unit in a transport direction. Before starting feeding of the medium downstream in the transport direction, by repeating, a plurality of times, a preliminary feed operation of coming into contact with a first medium and rotating, and a non-feed operation of not feeding the medium, the feed roller forms a misaligned stacking state in which the first medium is disposed further downstream, in the transport direction, than at least some of the plurality of media disposed closer to the placement unit side. The feed roller feeds the first medium downstream in the transport direction from the placement unit subsequent to formation of the misaligned stacking state.

9 Claims, 9 Drawing Sheets

(56) References Cited

U.S. PATENT DOCUMENTS

| | | | | |
|---|---|---|---|---|
| 10,543,997 | B2 * | 1/2020 | Sawashima | B65H 3/0684 |
| 11,117,761 | B2 * | 9/2021 | Aoki | G03G 15/6511 |
| 2021/0260898 | A1 | 8/2021 | Takei | |
| 2022/0073296 | A1 * | 3/2022 | Oshiro | B65H 3/06 |
| 2023/0249930 | A1 * | 8/2023 | Morimoto | B65H 3/56<br>347/104 |

* cited by examiner

PRINTING DEVICE

The present application is based on, and claims priority from JP Application Serial Number 2023-036130, filed Mar. 9, 2023, the disclosure of which is hereby incorporated by reference herein in its entirety.

BACKGROUND

1. Technical Field

The present disclosure relates to a printing device.

2. Related Art

Hitherto, various types of printing device have been used. Among them, there is a printing device that includes a placement unit on which a plurality of single-cut media can be placed, feeds the media one by one from the placement unit, and performs printing while transporting the media one by one. For example, JP-A-2021-130286 discloses a printing device that includes a single sheet storage unit in which a plurality of single sheets can be stacked, a pickup roller, a separating roller, and a retarding roller, and that is configured to feed the single sheets one by one from the single sheet storage unit by the pickup roller, separate the single sheets using the separating roller and the retarding roller, and perform printing while conveying the single sheets one by one.

However, in the printing device of the related art having the configuration in which the media are separated by the separating roller and the retarding roller, such as in the printing device disclosed in JP-A-2021-130286, there is a concern that a nip mark or the like may remain on the medium and the medium may be damaged, such as when a nip pressure between the separating roller and the retarding roller is too strong, or the like. On the other hand, when the nip pressure between the separating roller and the retarding roller is too weak, separation accuracy of the media deteriorates.

SUMMARY

A printing device according to an aspect of the present disclosure includes a placement unit on which a plurality of single sheet media are stackable, a printing unit configured to perform printing on the medium, and a feed roller provided at a position facing the placement unit and configured to feed the medium placed on the placement unit in a transport direction from the placement unit toward the printing unit. By repeating a preliminary feed operation and a non-feed operation a plurality of times before starting the feeding of the medium downstream in the transport direction from the placement unit, the feed roller forms a misaligned stacking state in which a first medium is disposed further downstream, in the transport direction, than the media disposed closer to the placement unit side than the first medium in a stacking direction, the preliminary feed operation causing the feed roller to come into contact with the first medium disposed furthest to the feed roller side, in the stacking direction, of the media stacked on the placement unit and to rotate, and the non-feed operation that is an operation different from the preliminary feed operation. The feed roller feeds the first medium downstream in the transport direction from the placement unit subsequent to formation of the misaligned stacking state.

DESCRIPTION OF EMBODIMENTS

Figure 1:
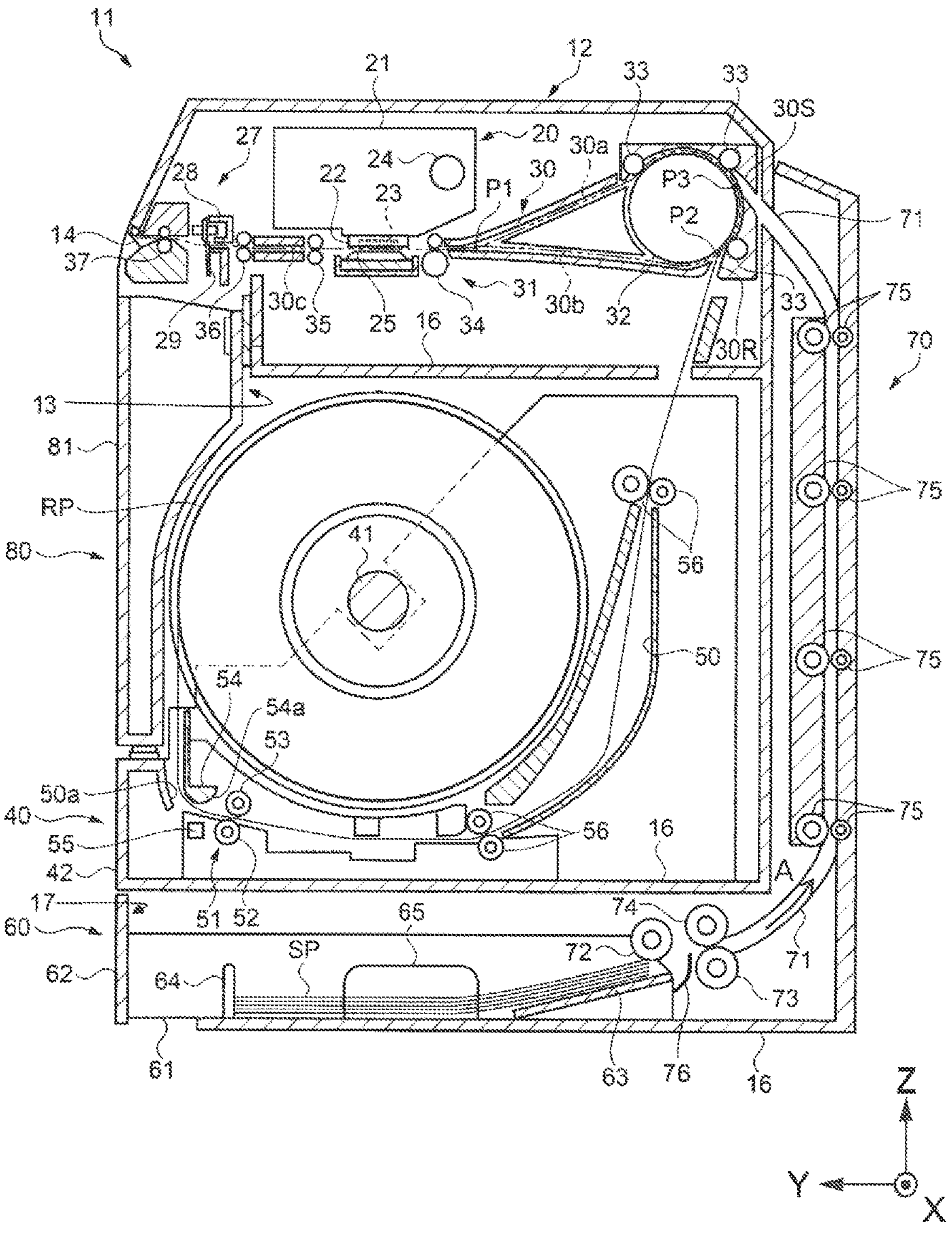
FIG. 1 is a side cross-sectional view illustrating an internal configuration of a printing device according to an embodiment of the present disclosure.

First, an overview of the present disclosure will be described.

A printing device according to an aspect of the present disclosure includes a placement unit on which a plurality of single sheet media are stackable, a printing unit configured to perform printing on the medium, and a feed roller provided at a position facing the placement unit and configured to feed the medium placed on the placement unit in a transport direction from the placement unit toward the printing unit. By repeating a preliminary feed operation and a non-feed operation a plurality of times before starting the feeding of the medium downstream in the transport direction from the placement unit, the feed roller forms a misaligned stacking state in which a first medium is disposed further downstream, in the transport direction, than the media disposed closer to the placement unit side than the first medium in a stacking direction, the preliminary feed operation causing the feed roller to come into contact with the first medium disposed furthest to the feed roller side, in the stacking direction, of the media stacked on the placement unit and to rotate, and the non-feed operation that is an operation different from the preliminary feed operation. The feed roller feeds the first medium downstream in the transport direction from the placement unit subsequent to formation of the misaligned stacking state.

According to this aspect, before starting the feeding of the first medium downstream in the transport direction, the feed roller repeats, a plurality of times, the preliminary feed operation of coming into contact with the first medium and rotating, and the non-feed operation of not feeding the medium. In this way, the feed roller forms the misaligned stacking state in which the first medium is disposed further downstream, in the transport direction, than at least some of the plurality of media disposed closer to the placement unit side. Then, the first medium is fed from the placement unit downstream in the transport direction after the misaligned stacking state is formed. In this manner, by forming the misaligned stacking state, it is easy to separate the first medium from the remaining media disposed closer to the placement unit than the first medium. For this reason, it is possible to improve feeding accuracy of the medium placed on the placement unit while suppressing damage to the medium.

In the printing device according to a second aspect of the present disclosure, in an aspect dependent on the first aspect, a separating roller pair formed by a separating roller and a retarding roller is provided downstream of the feed roller in the transport direction.

According to this aspect, the separating roller pair formed by the separating roller and the retarding roller is provided downstream of the feed roller in the transport direction. By adopting such a configuration, even when a nip pressure of the separating roller pair is weakened, it is easy to separate the first medium from the remaining media disposed closer to the placement unit than the first medium. Thus, it is possible to improve the feeding accuracy of the medium placed on the placement unit while suppressing damage to the medium.

In the printing device according to a third aspect of the disclosure, in an aspect dependent on the second aspect, the printing device includes a separating member provided between the feed roller and the separating roller pair in the transport direction, the separating member being configured to make sliding contact with a leading end of the medium fed by the feed roller.

According to this aspect, the separating member with which the leading end of the medium fed by the feed roller comes into sliding contact is provided between the feed roller and the separating roller pair in the transport direction. For this reason, it is particularly easy to separate the first medium from the remaining media disposed closer to the placement unit than the first medium.

In the printing device according to a fourth aspect of the disclosure, in an aspect dependent on the third aspect, the separating member includes a sliding contact surface formed with a recessed portion extending in a width direction of the medium being formed in the sliding contact surface, and the leading end of the medium makes sliding contact with the sliding contact surface.

According to this aspect, the separating member includes the sliding contact surface, the recessed portion extending in the width direction of the medium being formed in the sliding contact surface, and the leading end of the medium making sliding contact with the sliding contact surface. Since an inclined surface and the recessed portion are formed in this manner, separation accuracy between the first medium and the remaining media disposed closer to the placement unit than the first medium is particularly improved.

In the printing device according to a fifth aspect of the disclosure, in an aspect dependent on the fourth aspect, the separating member includes recessed portion separating members in which the recessed portion is formed and non-recessed portion separating members in which the recessed portion is not formed. In a region in which the separating member is disposed, the recessed portion separating members are disposed at positions symmetrical to each other with respect to the center of the medium in the width direction, and, in the region in which the separating member is disposed, the non-recessed portion separating members are disposed at positions symmetrical to each other with respect to the center of the medium in the width direction.

According to this aspect, the separating member includes the recessed portion separating members in which the recessed portion is formed and the non-recessed portion separating members in which the recessed portion is not formed. In the region in which the separating member is disposed, the recessed portion separating members are disposed at positions symmetrical to each other with respect to the center of the medium in the width direction, and, in the region in which the separating member is disposed, the non-recessed portion separating members are disposed at positions symmetrical to each other with respect to the center of the medium in the width direction. By adopting such a configuration, at the same time as particularly improving the separation accuracy between the first medium and the remaining media disposed closer to the placement unit than the first medium, it is also possible to simplify the device configuration compared to a case in which all the separating members are the recessed portion separating members.

In the printing device according to a sixth aspect of the disclosure, in an aspect dependent on any one of the first to fifth aspects, during execution of the non-feed operation, the feed roller is separated from the first medium.

According to this aspect, the feed roller is separated from the first medium during the execution of the non-feed operation. By adopting such a configuration, it is possible to suppress the feed roller from feeding the first medium during the execution of the non-feed operation, and it is also possible to form a layer of air between the first medium and the remaining media disposed closer to the placement unit than the first medium by interposing the operation of separating from the first medium. As a result, it is possible to improve a separation capability between the first medium and the remaining media.

In a printing device according to a seventh aspect of the disclosure, in an aspect dependent on the sixth aspect, the feed roller is driven by a motor. The feed roller comes into contact with the first medium and rotates when the motor rotates in a first direction in accordance with the preliminary feed operation, and the feed roller separates from the first medium when the motor rotates in a second direction, opposite to the first direction, in accordance with the non-feed operation.

According to this aspect, the feed roller rotates in contact with the first medium when the motor rotates in the first direction in accordance with the preliminary feed operation, and separates from the first medium when the motor rotates in the second direction in accordance with the non-feed operation. By adopting such a configuration, it is possible to bring the feed roller into a state of being rotated even during the execution of the non-feed operation, and rotation control of the feed roller is simplified.

In a printing device according to an eighth aspect of the disclosure, in an aspect dependent on the second aspect, a transport roller configured to transport the medium is provided downstream of the separating roller in the transport direction, and a drive source of the feed roller, the separating roller, and the transport roller is shared.

According to this aspect, the drive source of the feed roller, the separating roller, and the transport roller is shared. The configuration of the device can thus be simplified, and downsizing of the device is possible.

In a printing device according to a ninth aspect of the disclosure, in an aspect dependent on the eighth aspect, a driving force transmission member is provided between a motor as the drive source and the transport roller. The driving force transmission member is configured to rotate the transport roller in a same direction, both when the motor rotates in a first direction and when the motor rotates in a second direction opposite to the first direction.

According to this aspect, the driving force transmission member is provided, between the motor and the transport roller, that is configured for the transport roller to rotate in the same direction both when the motor rotates in the first direction and when the motor rotates in the second direction. By adopting such a configuration, control of the motor can be simplified.

Embodiments according to the present disclosure will be described in detail below with reference to the accompanying drawings. First, an overview of a printing device 11 according to an embodiment of the present disclosure will be described with reference to FIG. 1. The printing device 11 is, for example, an ink jet-type printer configured to discharge ink onto a medium to perform printing. In coordinates indicated in the drawings, three virtual axes orthogonal to each other are set as an X-axis, a Y-axis and a Z-axis on the assumption that the printing device 11 is placed on a horizontal surface. The Y-axis is an axis parallel to the front-rear direction of the printing device 11, and the tip side of an arrow indicating the Y-axis is defined as the "front". The X-axis is an axis parallel to the left-right direction of the printing device 11, and the tip side of an arrow indicating the X-axis is defined as "right". The Z-axis is a virtual axis parallel to the vertical direction, and the tip side of an arrow indicating the Z-axis is defined as "up".

As illustrated in FIG. 1, the printing device 11 includes a cuboid housing 12 and a main body frame 16 that supports portions of the printing device 11. A roll paper storage unit 40 that stores roll paper RP that is a medium, a single sheet storage unit 60 that stores a single sheet SP that is a medium other than the roll paper RP, and a printing unit 20 that can print on the roll paper RP supplied from the roll paper storage unit 40 and can print on the single sheet SP supplied from the single sheet storage unit 60 are provided inside the housing 12. The roll paper storage unit 40 and the single sheet storage unit 60 are positioned below the printing unit 20 in the vertical direction. Further, a range in the Y-axis over which the printing unit 20 is present overlaps a range in the Y-axis over which the roll paper storage unit 40 is present and a range in the Y-axis over which the single sheet storage unit 60 is present. In the printing device 11 according to the embodiment, the single sheet storage unit 60 is positioned below the roll paper storage unit 40.

1-1. Printing Unit

The printing unit 20 includes a head 22 including nozzles 23 that discharge the ink toward the medium, a carriage 21 on which the head 22 is mounted, and a guide rail 24 disposed along the X-axis. The printing unit 20 includes a movement mechanism that causes the carriage 21 to reciprocate along the guide rail 24. A support unit 25 that supports the medium is provided at a position facing the head 22. By discharging the ink while reciprocating together with the carriage 21 in a width direction of the medium, the head 22 performs the printing on the medium supported by the support unit 25. In the embodiment, a serial head-type printing unit in which the head 22 reciprocates in the width direction is given as an example of the printing unit 20, but the printing unit 20 may be a line head-type printing unit in which the head 22 is fixedly arranged extending in the width direction.

A medium transport path 30 along which the medium is transported, and a cutting unit 27 capable of cutting the medium on which the printing has been performed by the printing unit 20 are provided in an upper portion of the housing 12. The medium transport path 30 includes a supply path 30*a* and an inversion path 30*b* provided upstream of the support portion 25, and a discharge path 30*c* provided downstream of the support portion 25. Further, the supply path 30*a* includes a roll paper supply path 30R along which the roll paper RP, which is an example of the medium, is supplied, and a single sheet supply path 30S along which the single sheet SP which is an example of the medium, is supplied.

The supply path 30*a* is a path that couples the roll paper supply path 30R to the support portion 25. A roll paper convergence point P2 at which the supply path 30*a* merges with the roll paper supply path 30R is provided upstream in the supply path 30*a*. A branch point P1 branching from the supply path 30*a* when the medium is transported from downstream to upstream is provided downstream in the supply path 30*a*. The supply path 30*a* branches out to the inversion path 30*b* at the branch point P1. The inversion path 30*b* is a path that couples the branch point P1 to the roll paper convergence point P2. A single sheet convergence point P3 at which the supply path 30*a* converges with the single sheet supply path 30S is provided between the roll paper convergence point P2 and the branch point P1 in the supply path 30*a*.

A discharge port 14 for discharging the medium on which the printing has been performed is provided at the front surface of the housing 12. Note that, in the embodiment, the front surface of the housing 12 is a surface facing to the front of the housing 12. The discharge path 30*c* is a path coupling the support portion 25 to the discharge port 14. The cutting unit 27 that cuts the medium on which printing has been performed by the printing unit 20 is provided partway along the discharge path 30*c*. The cutting unit 27 includes a movable blade 28 configured to be capable of reciprocating along the X-axis that is the width direction of the medium, and a fixed blade 29 fixed extending in the width direction. The movable blade 28 is provided above the discharge path 30*c* and the fixed blade 29 is provided below the discharge path 30*c*. The movable blade 28 moves in the width direction while coming into contact with the fixed blade 29, and thus, for example, the roll paper RP unwound from the rolled state, margins, and the like are cut. Below the cutting unit 27, an off-cut storage unit 80 is provided that accommodates off-cut waste generated by the cutting by the cutting unit 27.

The medium transport path 30 is provided with a transport unit 31 that transports the medium supplied to the medium transport path 30. The transport unit 31 includes an intermediate roller 32, a plurality of driven rollers 33 provided at the outer periphery of the intermediate roller 32, and an upstream transport roller pair 34, in this order on the supply path 30*a* from upstream. The driven roller 33 is rotatably provided and is driven to rotate with the medium disposed between the driven roller 33 and the intermediate roller 32. The transport unit 31 includes a downstream transport roller pair 35, a first roller pair 36, and a second roller pair 37, in this order on the discharge path 30*c* from upstream. The first roller pair 36 is located upstream of the cutting unit 27, and the second roller pair 37 is located downstream of the cutting unit 27.

The intermediate roller 32, the driven rollers 33, the upstream transport roller pair 34, the downstream transport roller pair 35, the first roller pair 36, and the second roller pair 37 transport the medium by rotating in a state of sandwiching the medium. As a result of being driven in a forward direction, the transport unit 31 transports the medium to a plus side of the Y-axis, namely, from upstream to downstream. As a result of being driven in a reverse direction, the transport unit 31 transports the medium to a minus side of the Y-axis, namely, from downstream to upstream.

The printing device 11 discharges the ink from the printing unit 20 onto the medium positioned at the support portion 25 while driving the transport unit 31 in the forward direction to transport the medium from upstream to downstream, thus performing the printing on a first surface of the medium. The printing device 11 can also perform the printing on a second surface, which is the reverse surface from the first surface of the medium. After performing the printing on the first surface, the printing device 11 transports the medium from downstream to upstream by driving the transport unit 31 in the reverse direction. The medium passes from the branch point P1 and reaches an upstream position of the supply path 30*a* via the inversion path 30*b*. The printing device 11 drives the transport unit 31 in the forward direction once again so that the medium makes one rotation around the outer periphery of the intermediate roller 32, thus inverting the front and back sides of the medium. The printing device 11 discharges the ink from the printing unit 20 onto the medium positioned at the support portion 25 while transporting the medium from upstream to downstream, thus performing the printing on the second surface of the medium. In this way, the printing is performed on both surfaces of the medium. Note that when the medium is the roll paper RP unwound from the rolled state, after the printing is performed on the front surface thereof, the medium is cut into the single sheet by the cutting unit 27, and the printing is subsequently performed on the back surface.

1-2. Roll Paper Storage Unit

The roll paper storage unit 40 is provided below the printing unit 20 in the vertical direction, in the housing 12. Further, in the Y-axis direction, the range in which the roll paper storage unit 40 is present overlaps the range in which the printing unit 20 is present. The roll paper storage unit 40 includes a front plate portion 42 that forms a part of the housing 12 at a lower portion of the front surface thereof. The roll paper storage unit 40 rotatably supports the roll paper RP via a support shaft 41 extending in an X direction of the housing 12. In other words, by the roll paper RP is rotatably supported by the roll paper storage unit 40 so as to rotate with the support shaft 41 around the support shaft 41.

The support shaft 41 is configured to be capable of being rotationally driven in both the forward and reverse directions. The roll paper R is driven to rotate in both the forward and reverse directions via the support shaft 41. Further, the roll paper storage unit 40 is provided with a roll paper transport path 50 for transporting the roll paper RP unwound from the rolled state toward the roll paper supply path 30R.

The roll paper transport path 50 includes a bent portion 50*a* bending at substantially a right angle at an upstream end portion of the roll paper transport path 50, that is, at a position to the front of and diagonally downward from the roll paper R on the roll paper transport path 50. Further, a decurling mechanism 51 is provided immediately downstream of the bent portion 50*a* in the roll paper transport path 50. The decurling mechanism 51 performs decurling to correct the curl of the roll paper RP. The decurling mechanism 51 is provided with a first roller 52, a second roller 53, a curved surface portion 54 having a curved surface 54*a* forming part of the bent portion 50*a*, and a moving device 55 for moving the first roller 52. In the embodiment, the second roller 53 is configured by a driving roller which is driven by a motor 100 which is disposed inside the housing 12 and which will be described later, and the first roller 52 is configured by a driven roller which is driven to rotate by the rotational driving force of the second roller 53 being transmitted via the roll paper RP when the first roller 52 is at a nip position.

Downstream from the decurling mechanism 51 in the roll paper transport path 50, a roll paper transport roller pair 56 that imparts a transport force to the roll paper RP is installed with a suitable interval therebetween. When the roll paper transport roller pair 56 is driven to rotate, the roll paper RP is transported to the roll paper supply path 30R.

The roll paper storage unit 40 is supported by the main body frame 16. When storing the roll paper RP, the roll paper storage unit 40 is opened at the front of the printing device 11 through an opening 13 formed at a central portion in the front surface of the housing 12 The roll paper storage unit 40 is configured to be movable with respect to the main body frame 16 so as to be pulled out to the front of the printing device 11. In other words, the roll paper storage unit 40 is configured to be movable, with respect to the printing device 11, to the side at which the medium is discharged from the discharge port 14.

1-3. Off-Cut Storage Unit

The off-cut storage unit 80 is disposed in front of the roll paper storage unit 40, and is detachably attached to the main body frame 16. The front plate portion 42 of the roll paper storage unit 40 that can be pulled out is exposed below the off-cut storage unit 80.

The off-cut storage unit 80 includes an outer wall 81 that covers the opening 13 when attached to the housing 12, an inner wall 82 that faces the outer wall 81, and side walls 83 that are joined to the outer wall 81 and the inner wall 82 at both ends in the X direction. A bottom wall 84 is provided at a lower end portion of the off-cut storage portion 80, and a receiving port 85 for receiving the off-cut waste cut by the cutting portion 27 is provided at an upper end portion of the off-cut storage portion 80. The inner wall 82 is curved along the outer periphery of the roll paper RP in the rolled state.

When the off-cut storage unit 80 is attached, the opening 13 is covered by the outer wall 81 and the front plate portion 42. At this time, the outer surface of the outer wall 81 is flush with the outer surface of the front plate portion 42. That is, the outer wall 81 of the off-cut storage unit 80 and the front plate portion 42 of the roll paper storage unit 40 function as part of the housing 12 of the printing device 11. The off-cut storage unit 80 is removed from the main body frame 16 in a state in which the roll paper storage unit 40 is open to the front.

1-4. Single Sheet Storage Unit

In the housing 12, the single sheet storage unit 60 is provided below the roll paper storage unit 40 in the vertical direction. In the Y-axis direction, the range over which the single sheet storage unit 60 is present overlaps the range over which the roll paper storage unit 40 is present. The single sheet storage unit 60 includes a front plate portion 62 that forms a part of the housing 12 at the front surface thereof. The single sheet storage unit 60 has a box-shaped tray 61 in which the single sheets SP, which are the single-cut media, are stored. The tray 61 is provided with a pair of edge guides 65 that are operated when positioning the single sheet SP in the width direction, a stopper 64 that is operated when positioning the single sheet SP in the front-rear direction, and a placement surface 63 that causes the downstream end of the single sheet SP stored in the tray 61 to face a pickup roller 72.

The single sheet storage unit 60 is supported by the main body frame 16. When storing the single sheets SP, the single sheet storage unit 60 is opened at the front of the printing device 11 through an opening 17 formed at a lower portion of the front surface of the housing 12. The single sheet storage unit 60 is movable with respect to the main body frame 16 so as to be pulled out to the front of the printing device 11. Further, the off-cut storage unit 80 is not positioned on a movement path of the single sheet storage unit 60, namely, is not positioned in front of the single sheet storage unit 60.

The single sheet storage unit 60 forms a part of a single sheet supply unit 70 that supplies the single sheets SP to the printing unit 20. The single sheet supply unit 70 includes the single sheet storage unit 60 that includes the placement surface 63 as a placement unit on which a plurality of the single sheets SP can be stacked, a single sheet transport path 71, the pickup roller 72 as a feed roller that is provided at a position facing the single sheet storage unit 60 and that feeds the single sheet SP stacked on the single sheet storage unit 60 in a transport direction A from the single sheet storage unit 60 toward the printing unit 20, a retarding roller 73, a separating roller 74, a separating member 76, and the like.

The pickup roller 72 is positioned above the downstream end portion of the single sheet SP stored in the single sheet storage unit 60. The pickup roller 72 removes the single sheet SP by rotating while in contact with the single sheet SP. The retarding roller 73 and the separating roller 74 are provided facing each other in the vertical direction, downstream of the pickup roller 72. The retarding roller 73 and the separating roller 74 rotate while sandwiching the single sheet SP removed from the single sheet storage unit 60 by the pickup roller 72, thus feeding the single sheet SP toward the printing unit 20.

The separating roller 74 is a roller that comes into contact with the same surface of the single sheet SP as the surface with which the pickup roller 72 comes into contact, and the retarding roller 73 is a roller that comes into contact with the surface on the opposite side. In other words, the retarding roller 73 is positioned below the separating roller 74. Note that the retarding roller 73 is a roller that is driven to rotate in accordance with the rotation of the separating roller 74. Further, the retarding roller 73 is configured to have a larger coefficient of friction with respect to the single sheet SP than that of the separating roller 73. Then, the separating roller 74 and the retarding roller 73 separate and transport the single sheets SP one by one using the difference in the coefficient of friction.

Further, the separating member 76 makes sliding contact with the leading end of the single sheet SP fed in the transport direction A by the pickup roller 72, and separates the uppermost single sheet SP1 from the other single sheets SP, of the stacked single sheets SP, so that double feeding of the single sheets SP stacked in the single sheet storage unit 60 does not occur. The separating of the stacked single sheets SP by the retarding roller 73, the separating member 76, and the like will be described in detail later.

The single sheet transport path 71 is bent upward from the separating roller 74 and the retarding roller 73, and extends upward toward the single sheet supply path 30S to the rear of the roll paper storage unit 40. In the single sheet transport path 71, a single sheet transport roller pair 75 that applies a transport force to the single sheet SP is installed with an appropriate interval therebetween. When the single sheet transport roller pair 75 is driven to rotate, the single sheet SP is transported to the single sheet supply path 30S.

2. Feeding of Single Sheet Stored in Single Sheet Storage Unit

Hereinafter, the feeding of the single sheet SP stored in the single sheet storage unit 60 will be described in detail with reference to FIG. 2 to FIG. 9. The printing device 11 according to the embodiment is configured to be able to suppress double feeding of the single sheet SP without damaging the single sheet SP, by repeating a preliminary feed operation and a non-feed operation before feeding the single sheet SP toward the single sheet transport roller pair 75.

Figure 2:
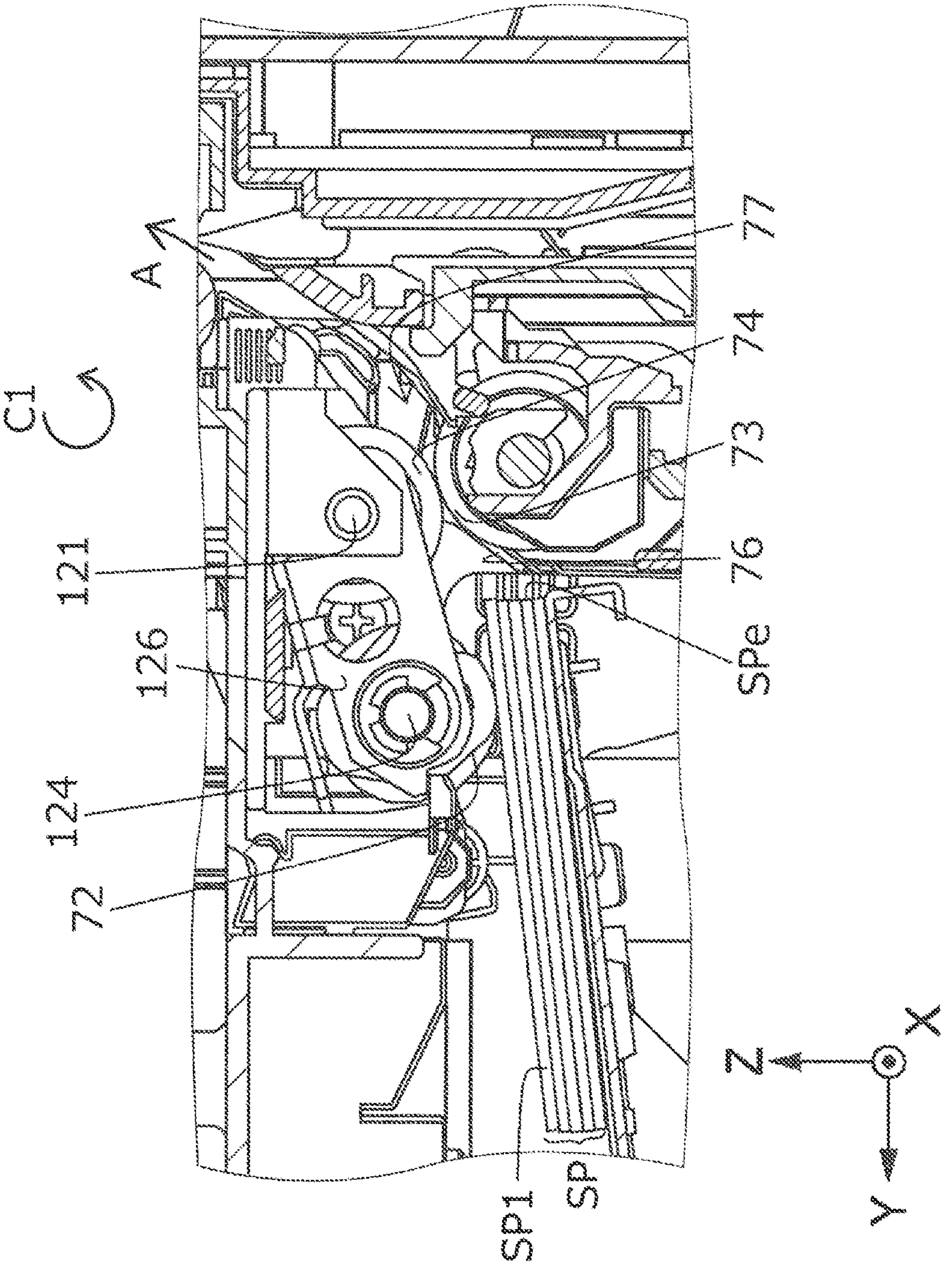
FIG. 2 is a side cross-sectional view illustrating a state in which, in the printing device illustrated in FIG. 1, a preliminary feed operation is performed before a single sheet is fed toward a single sheet transport roller pair, and illustrates a state in which a pickup roller is brought into contact with the single sheet immediately after the start of the preliminary feed operation and the pickup roller starts to rotate.
Figure 3:
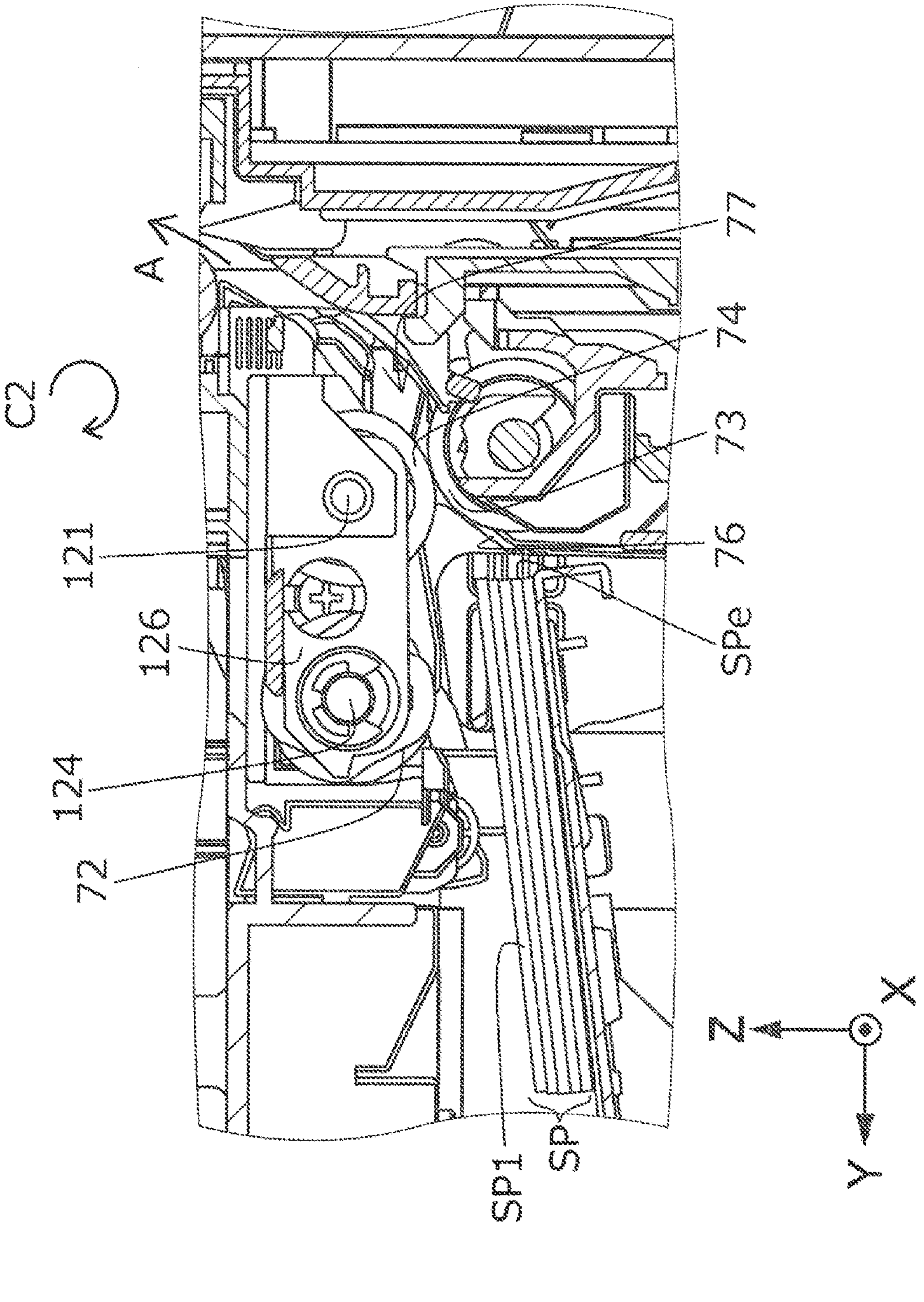
FIG. 3 is a side cross-sectional view of the printing device illustrated in FIG. 1, illustrating a state in which, subsequent to the state illustrated in FIG. 2, the pickup roller is separated from the single sheet and a non-feed operation is performed.
Figure 4:
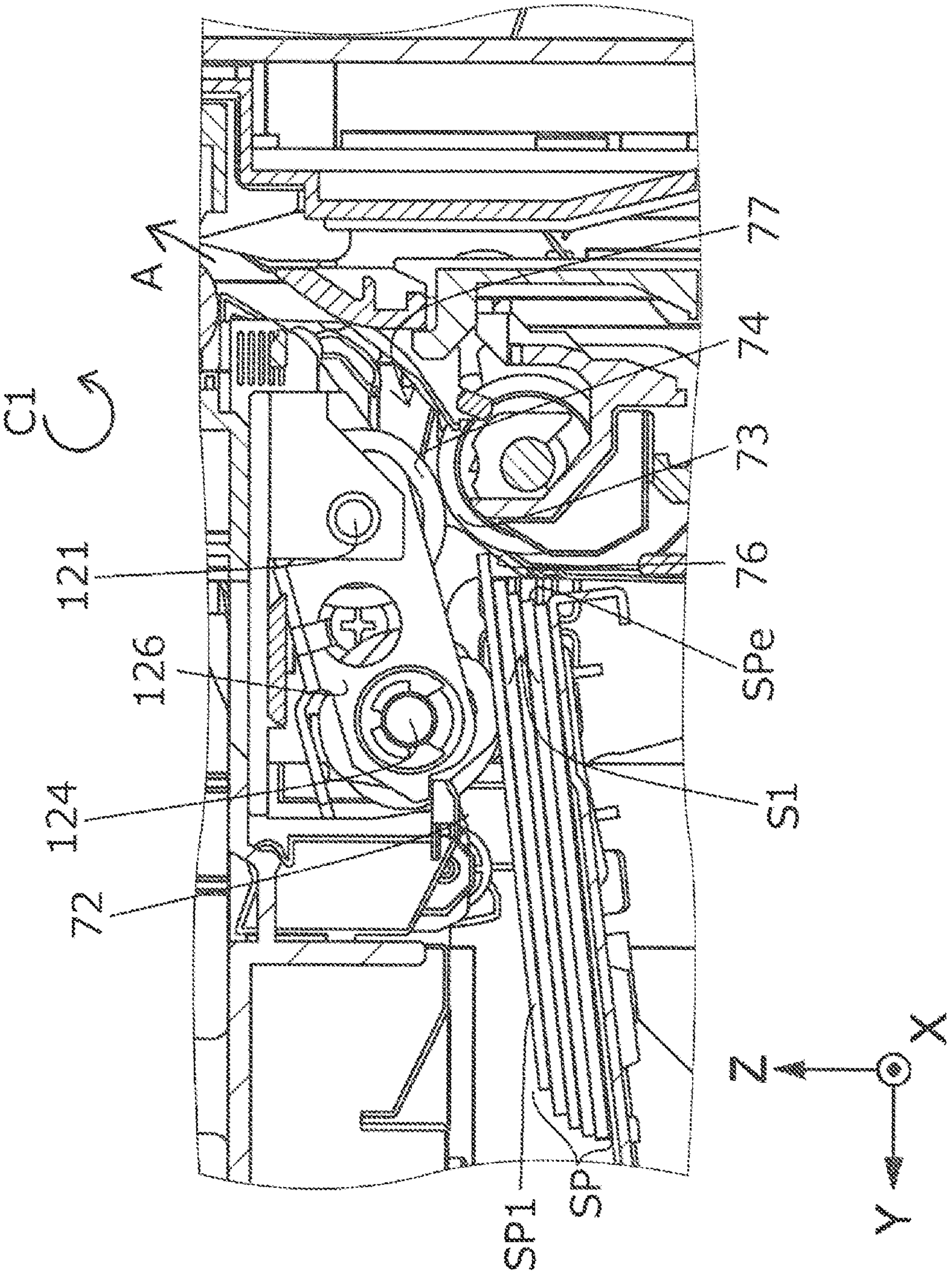
FIG. 4 is a side cross-sectional view of the printing device illustrated in FIG. 1, illustrating a state in which, subsequent to the state illustrated in FIG. 3, the pickup roller is brought into contact with the single sheet once again and the preliminary feed operation is performed once again.

Here, FIG. 2 is a side cross-sectional view illustrating a state in which the preliminary feed operation is performed before the single sheet SP is fed from the placement surface 63 toward the single sheet transport roller pair 75 in the printing device 11, and illustrates a state in which the pickup roller 72 is brought into contact with the single sheet SP immediately after the start of the preliminary feed operation and the pickup roller 72 starts to rotate in a rotation direction C1. Further, FIG. 3 is a side cross-sectional view of the printing device 11, and illustrates a state in which, subsequent to the state illustrated in FIG. 2, the pickup roller 72 is separated from the single sheet SP and the non-feed operation is performed. Note that, in this state, the pickup roller 72 is rotating in a rotation direction C2. Then, FIG. 4 is a side cross-sectional view of the printing device 11, and illustrates a state in which, subsequent to the state illustrated in FIG. 3, the pickup roller 72 is brought into contact with the single sheet SP once again and the preliminary feed operation is performed once again. Note that, in this state, the pickup roller 72 is rotating in the rotation direction C1. In the preliminary feed operation, the pickup roller 72 comes into contact with a single sheet SP1 and rotates in the rotation direction C1, thus moving the single sheet SP1 downstream in the transport direction. Further, in the non-feed operation, the pickup roller 72 separates from the single sheet SP, and thus does not move the single sheet SP downstream in the transport direction.

The printing device 11 repeats the preliminary feed operation illustrated in FIG. 2 and FIG. 4 and the non-feed operation illustrated in FIG. 3 three times. As a result, as shown by a stacked state of the single sheets SP in FIG. 4, at least some of the plurality of single sheets SP stacked on the placement surface 63 form a state in which, of the single sheets SP, the single sheets SP on an upper side are disposed further downstream, in the transport direction A, than the single sheets SP on a lower side. In particular, a misaligned stacking state S1 is formed in which, of the plurality of single sheets SP stacked on the placement surface 63, the single sheet SP1 stacked at the top of the single sheets SP is disposed further downstream in the transport direction A than the other single sheets SP. Note that, before the start of the preliminary feed operation, the pickup roller 72 is in the state illustrated in FIG. 3 in which the pickup roller 72 is separated from the single sheet SP. This is because the single sheet SP may be damaged if the time during which the pickup roller 72 is in contact with the single sheet SP is long.

In other words, before the pickup roller 72 starts feeding the single sheet SP downstream in the transport direction A from the placement surface 63, the pickup roller 72 repeats, a plurality of times, the preliminary feed operation in which the pickup roller 72 rotates while coming into contact with the single sheet SP1 that is a first medium closest to the pickup roller 72 in a stacking direction of the single sheets SP stacked on the placement surface 63, and a non-feed operation in which the pickup roller 72 performs an operation different from the preliminary feed operation, thus forming the misaligned stacking state S1 in which the single sheet SP1 is disposed further downstream in the transport direction A than the single sheets SP disposed closer to the placement surface 63 in the stacking direction. Then, subsequent to formation of the misaligned stacking state S1, the pickup roller 72 feeds the single sheet SP1 from the placement surface 63 downstream in the transport direction A.

By forming the misaligned stacking state S1 in this manner, when the single sheet SP1 is fed toward the single sheet transport roller pair 75 by the pickup roller 72, the single sheet SP1 is more easily separated from the remaining single sheets SP disposed closer to the placement surface 63 side than the single sheet SP1. This is because each of the single sheets SP stacked on the placement surface 63 moves more easily with respect to the single sheets SP with which each of the single sheets SP is in contact. As a result, the printing device 11 according to the embodiment can improve the feeding accuracy of the single sheet SP stacked on the placement surface 63 while suppressing damage to the single sheet SP.

Further, as illustrated in FIG. 2 to FIG. 4, the printing device 11 according to the embodiment is provided with the separating roller pair 77 including the separating roller 74 and the retarding roller 73, downstream of the pickup roller 72 in the transport direction A. By adopting such a configuration capable of forming the misaligned stacking state S1, even if a nip pressure on the single sheet SP by the separating roller pair 77 is weaker, the single sheet SP1 is more easily separated from the remaining single sheets SP disposed closer to the placement surface 63 side than the single sheet SP1. Thus, the printing device 11 according to the embodiment can improve the feeding accuracy of the single sheet SP stacked on the placement surface 63 while suppressing damage to the single sheet SP.

Further, as illustrated in FIG. 2 to FIG. 4, the printing device 11 according to the embodiment is provided with the separating member 76, between the pickup roller 72 and the separating roller pair 77 in the transport direction A, and the separating member 76 makes sliding contact with a leading end Spe of the single sheet SP fed by the pickup roller 72. In other words, by providing the separating member 76 in addition to the separating roller pair 77, two types of mechanism are provided for separating the single sheet SP1 from the remaining single sheets SP disposed closer to the placement surface 63 side than the single sheet SP1. Thus, by providing the separating member 76 in this way, it is particularly easy to separate the single sheet SP1 from the remaining single sheets SP disposed closer to the placement surface 63 side than the single sheet SP1.

Figure 5:
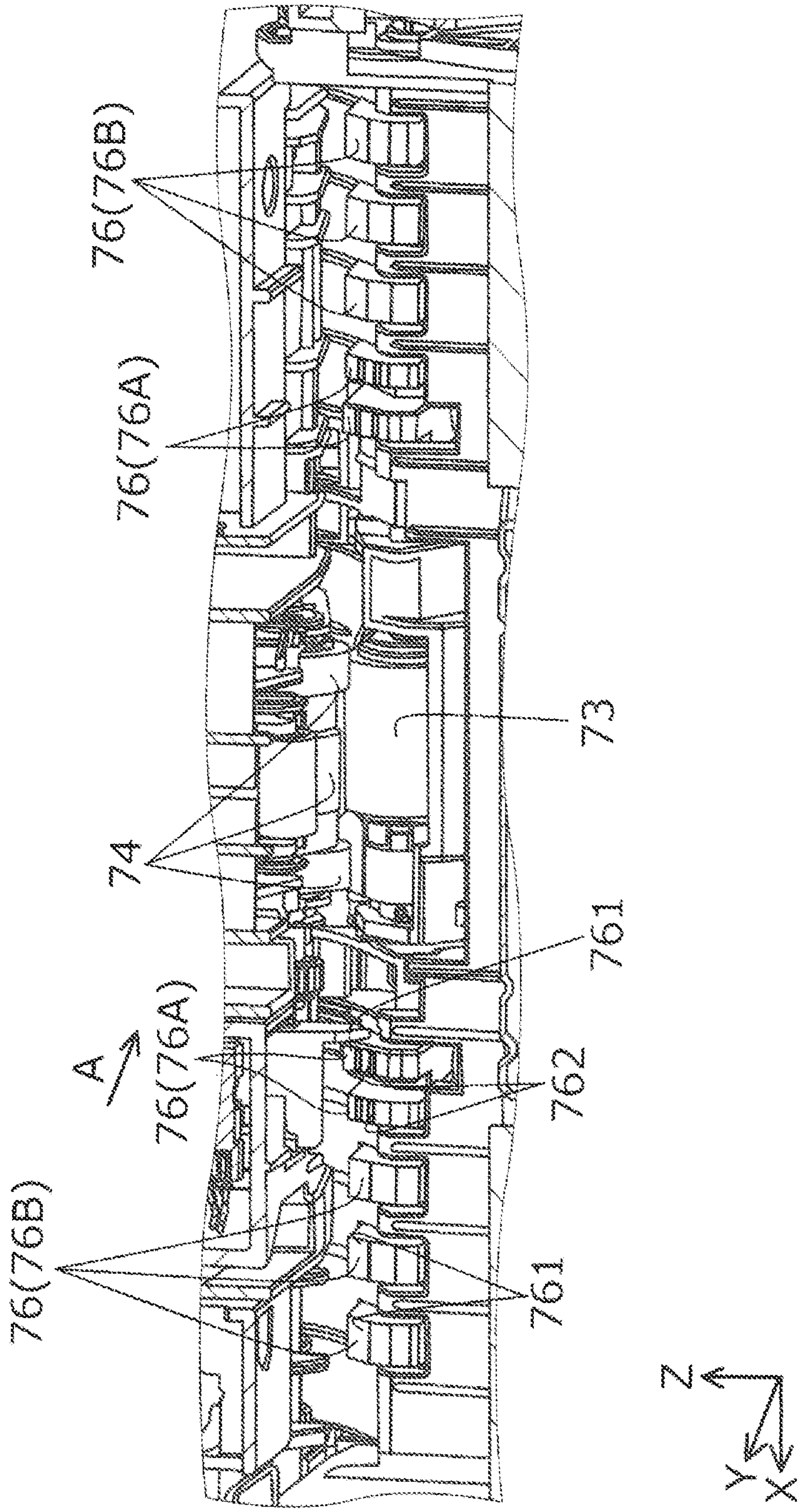
FIG. 5 is a perspective view illustrating a configuration of separating members and the like in the printing device illustrated in FIG. 1.

Here, a detailed configuration of the separating member 76 will be described with reference to FIG. 5 and FIG. 6. A plurality of the separating members 76 are formed in the width direction along the X direction. As the separating members 76, separating members 76A are formed at positions close to the center in the width direction, and separating members 76B are formed on both outer sides of the separating members 76A in the width direction. As illustrated in FIG. 5, both the separating member 76A and the separating member 76B are provided with an inclined surface 761 that is inclined with respect to the transport direction A when viewed from the width direction of the single sheet SP and that serves as a sliding contact surface that makes the sliding contact with the leading end of the single sheet SP1.

Figure 6:
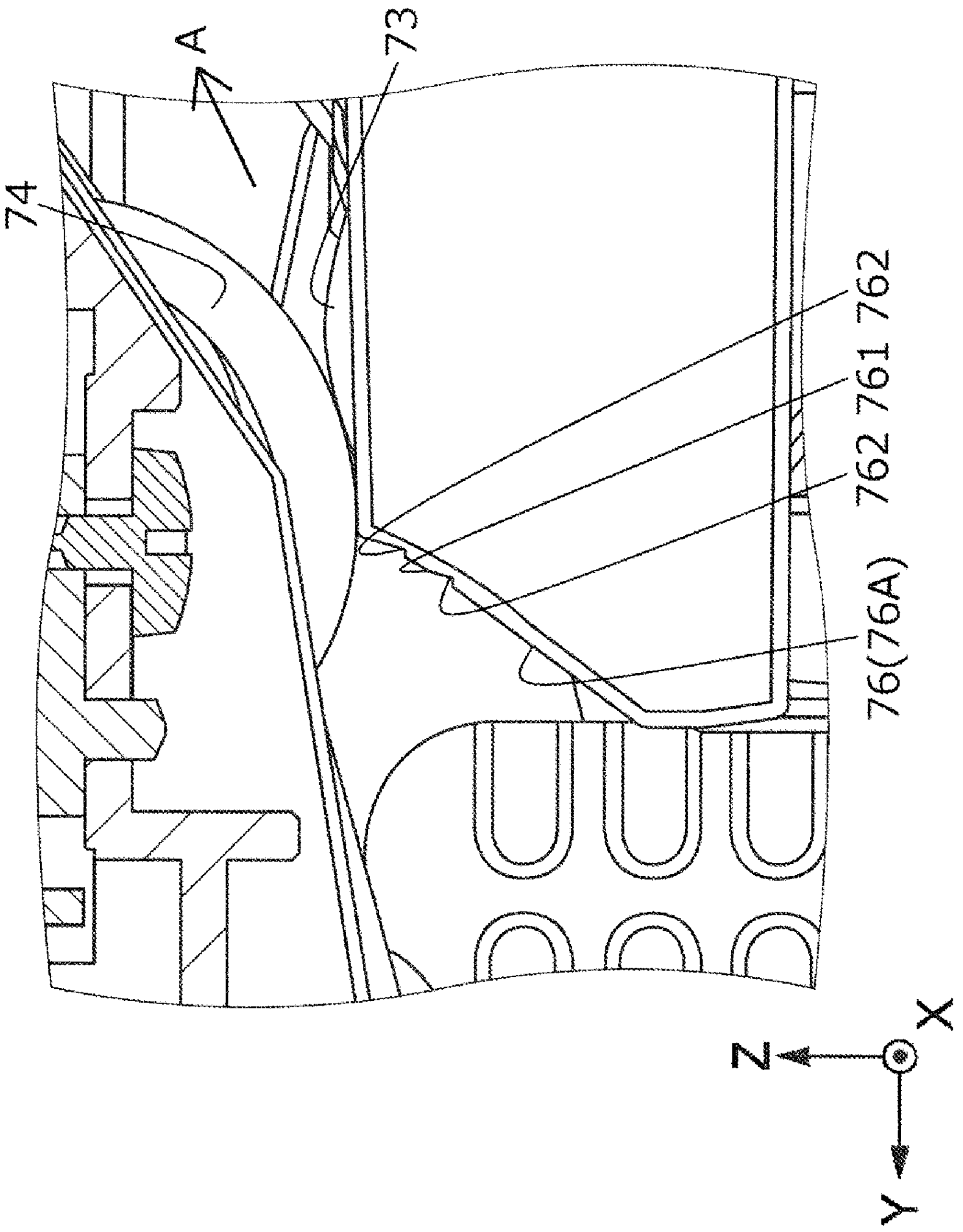
FIG. 6 is a side cross-sectional view illustrating a configuration of the separating members and the like in the printing device illustrated in FIG. 1.

As illustrated in FIG. 6, of the separating members 76, the separating member 76A includes the inclined surface 761 in which a recessed portion 762 extending in the width direction of the single sheet SP1 is formed. As described above, since the inclined surface 761 and the recessed portion 762 are formed in the separating member 76A, the separation accuracy between the single sheet SP1 and the remaining single sheets SP disposed closer to the placement surface 63 side than the single sheet SP1 is particularly improved.

As described above, as the separating members 76, the printing device 11 according to the embodiment includes the separating members 76A that are recessed portion separating members in which the recessed portion 762 is formed, and the separating members 76B that are non-recessed portion separating members in which the recessed portion 762 is not formed. As illustrated in FIG. 5, the separating members 76A are disposed at symmetrical positions with respect to the center in the width direction of the single sheet SP1 in a region in which the separating members 76 are disposed, and the separating members 76B are disposed at symmetrical positions with respect to the center in the width direction of the single sheet SP1 in the region in which the separating members 76 are disposed. More specifically, the separating members 76B are provided on both outer sides of the separating members 76A when viewed substantially in the transport direction A. In other words, when viewed substantially from the transport direction A, the separating members 76A are provided closer to the center in the width direction of the single sheet SP than the separating members 76B. By adopting such a configuration, in addition to being able to particularly improve the separation accuracy between the single sheet SP1 and the remaining single sheets SP disposed closer to the placement surface 63 side than the single sheet SP1, it is also possible to simplify a device configuration compared to a case in which all the separating members 76 are the recessed portion separating members. Further, when feeding the single sheet SP1, it is possible to suppress the single sheet SP1 from skewing. Further, the printing device 11 according to the embodiment is configured such that, regardless of the width of the single sheet SP, the single sheet SP is fed in a state of being brought close to a central portion, in the width direction, of the transport path, and it is thus possible to bring the single sheet SP into contact with the separating members 76A that have the high separation effect.

Specifically, when the single sheet SP1 is fed by the pickup roller 72, the remaining single sheets SP disposed closer to the placement surface 63 side than the single sheet SP1 are also pushed in the transport direction A. At this time, the leading end SPe of the single sheet SP1 comes into contact with the separating member 76 at a portion above the region in which the recessed portion 762 is formed, and the leading ends SPe of the remaining single sheets SP disposed closer to the placement surface 63 side than the single sheet SP1 come into contact with the separating member 76 at the region in which the recessed portion 762 is formed. Since the recessed portion 762 has a significant effect of stopping the single sheet SP even when the single sheet SP is pushed in the transport direction A, only the single sheet SP1 is easily fed in the transport direction A, and the remaining single sheets SP disposed closer to the placement surface 63 side than the single sheet SP1 are easily stopped at the separating member 76.

Figure 7:
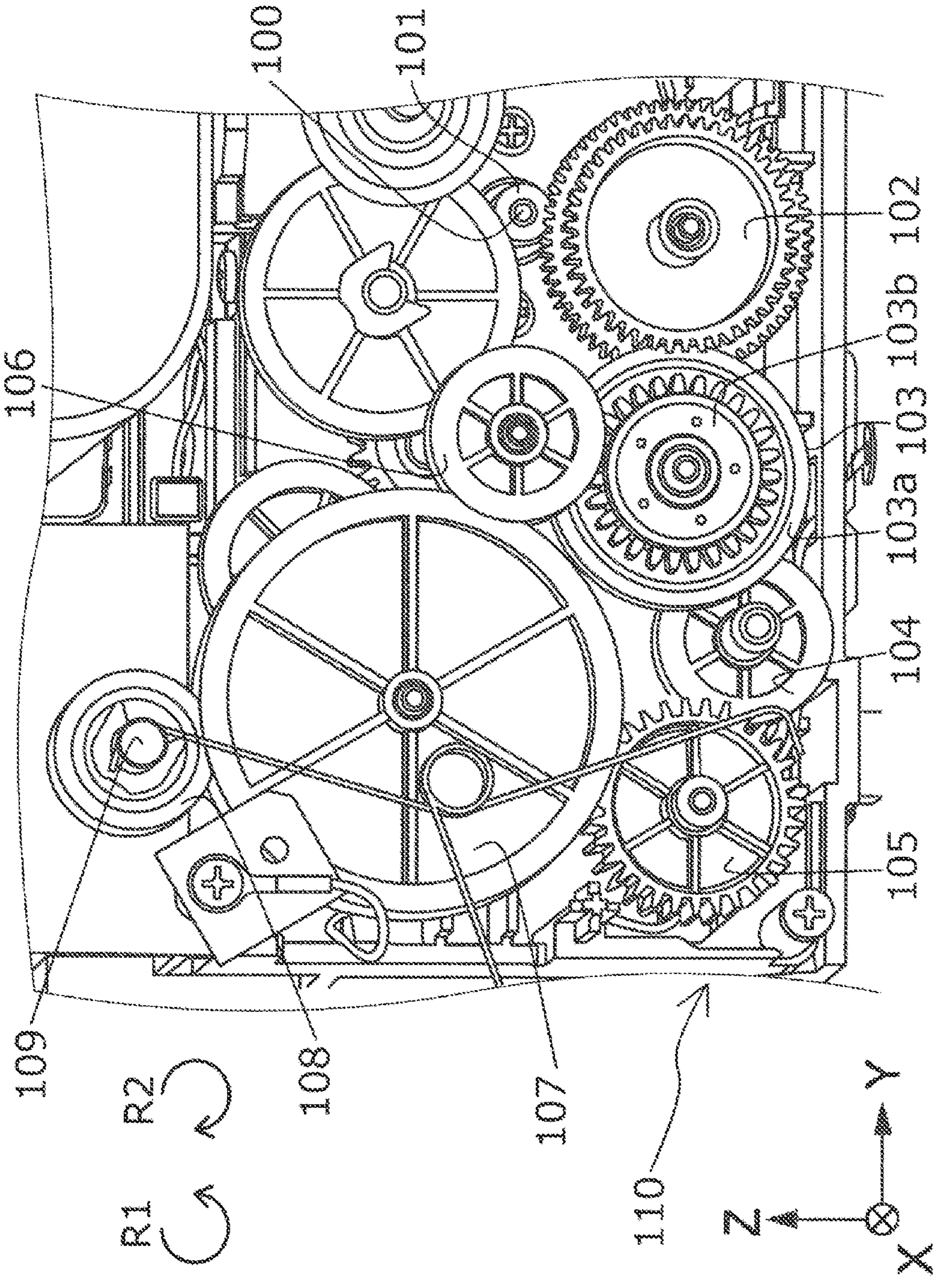
FIG. 7 is a side cross-sectional view illustrating a configuration of a driving force transmission member and the like in the printing device illustrated in FIG. 1.

Here, as illustrated in FIG. 1, the printing device 11 according to the embodiment is provided with the single sheet transport roller pair 75 as the transport rollers that transport the single sheet SP downstream of the separating roller 74 in the transport direction A. Then, in the printing device 11 according to the embodiment, the motor 100 is used as the drive source for all of the pickup roller 72, the separating roller 74, and the driving roller of the rollers constituting the single sheet transport roller pair 75. Note that only the rotation shaft of the motor 100 is illustrated in FIG. 7. In this way, by using the shared drive source for the pickup roller 72, the separating roller 74, and the driving roller of the single sheet transport roller pair 75, the device configuration can be simplified, the device can be downsized, and the like.

Further, as illustrated in FIG. 7, the printing device 11 according to the embodiment is provided with a driving force transmission member 110. The driving force transmission member 110 is provided between the rotation shaft of the motor 100 and a rotation shaft 109 of the driving roller of the single sheet transport roller pair 75, and is configured such that, regardless of when the rotation shaft of the motor 100 rotates in a first direction R1 and when the rotation shaft of the motor 100 rotates in a second direction R2 opposite to the first direction R1, the driving roller of the single sheet transport roller pair 75 rotates in the rotation direction R2 that is the same direction. With such a configuration, the control of the motor 100 can be simplified.

Here, the driving force transmission member 110 will be described in detail with reference to FIG. 7. A motor pinion 101 is provided at the rotation shaft of the motor 100. The motor pinion 101 rotates in the first direction R1 and the second direction R2 in synchronization with the rotation shaft of the motor 100. The motor pinion 101 is engaged with a gear 102. Thus, when the motor pinion 101 rotates in the first direction R1, the gear 102 rotates in the second direction R2, and when the motor pinion 101 rotates in the second direction R2, the gear 102 rotates in the first direction R1.

The gear 102 is engaged with a base gear portion 103*a* of a dual one-way gear 103. Thus, when the gear 102 rotates in the first direction R1, the base gear portion 103*a* rotates in the second direction R2, and when the gear 102 rotates in the second direction R2, the base gear portion 103*a* rotates in the first direction R1.

Here, the dual one-way gear 103 is constituted by the single base gear portion 103*a* and two one-way gear portions 103*b*. In FIG. 7, only one of the two one-way gear portions 103*b* on the minus X direction side is illustrated, and the other of the two one-way gear portions 103*b* on the plus X direction side is hidden by the base gear portion 103*a*. Note that the two one-way gear portions 103*b* have the same configuration.

However, the one-way gear portion 103*b* on the minus X direction side rotates in the rotation direction R1 together with the base gear portion 103*a* when the base gear portion 103*a* rotates in the rotation direction R1, but does not rotate when the base gear portion 103*a* rotates in the rotation direction R2, and the base gear portion 103*a* rotates idly. Conversely, the one-way gear portion 103*b* on the plus X direction side rotates in the rotation direction R2 together with the base gear portion 103*a* when the base gear portion 103*a* rotates in the rotation direction R2, but does not rotate when the base wheel portion 103*a* rotates in the rotation direction R1, and the base wheel portion 103*a* rotates idly. In other words, when the base gear portion 103*a* rotates in the rotation direction R1, of the two one-way gear portions 103*b*, only the one-way gear portion 103*b* on the minus X direction side rotates in the rotation direction R1, and when the base gear portion 103*a* rotates in the rotation direction R2, of the two one-way gear portions 103*b*, only the one-way gear portion 103*b* on the plus X direction side rotates in the rotation direction R2.

The one-way gear portion 103*b* on the minus X direction side is engaged with a gear 104. Thus, when the one-way gear portion 103*b* on the minus X direction side rotates in the first direction R1, the gear 104 rotates in the second direction R2. The gear 104 is engaged with a gear 105. Thus, when the gear 104 rotates in the second direction R2, the gear 105 rotates in the first direction R1. The gear 105 is engaged with a gear 107. Thus, when the gear 105 rotates in the first direction R1, the gear 107 rotates in the second direction R2.

The one-way gear portion 103*b* on the plus X direction side is engaged with a gear 106. Thus, when the one-way gear portion 103*b* on the plus X direction side rotates in the second direction R2, the gear 106 rotates in the first direction R1. The gear 106 is engaged with the gear 107. Thus, when the gear 106 rotates in the first direction R1, the gear 107 rotates in the second direction R2. That is, both when the rotation shaft of the motor 100 rotates in the rotation direction R1 and when the rotation shaft of the motor 100 rotates in the rotation direction R2, the gear 107 rotates in the second direction R2.

The gear 107 is engaged with a gear 108 fitted to the rotation shaft 109 of the driving roller of the single sheet transport roller pair 75. Thus, when the gear 107 rotates in the second direction R2, the gear 108 rotates in the first direction R1, and the driving roller of the single sheet transport roller pair 75 also rotates in the first direction R1. When the driving roller of the single sheet transport roller pair 75 rotates in the first direction R1, the single sheet SP nipped by the single sheet transport roller pair 75 is transported in the transport direction A.

Here, as illustrated in FIG. 3, in the printing device 11 according to the embodiment, the pickup roller 72 is separated from the single sheet SP1 during execution of the non-feed operation. With such a configuration, it is possible to suppress the pickup roller 72 from feeding the single sheet SP1 during the execution of the non-feed operation, and also, by interposing the operation of separating from the single sheet SP1, to form an air layer between the single sheet SP1 and the remaining single sheets SP disposed closer to the placement surface 63 than the single sheet SP1. As a result, the separation performance of separating the single sheet SL and the remaining single sheets SP is improved.

Note that, in the embodiment, the pickup roller 72 is reversely rotated in the rotation direction C2 during the execution of the non-feed operation. However, the configuration is not limited to this example, and instead of separating the pickup roller 72 during the execution of the non-feed operation, the pickup roller 72 may be stopped while being in contact with the single sheet SP1, or the like.

Then, in the printing device 11 according to the embodiment, the pickup roller 72 is driven by the motor 100, and comes into contact with the single sheet SP1 when the rotation shaft of the motor 100 rotates in the first direction R1 in accordance with the preliminary feed operation illustrated in FIG. 2 and FIG. 4. Then, the pickup roller 72 is separated from the single sheet SP when the rotation shaft of the motor 100 rotates in the second direction R2 opposite to the first direction R1, illustrated in FIG. 7, in accordance with the non-feed operation illustrated in FIG. 3. With such a configuration, the pickup roller 72 can be rotated even during the execution of the non-feed operation, and rotation control of the pickup roller 72 is simplified.

Figure 8:
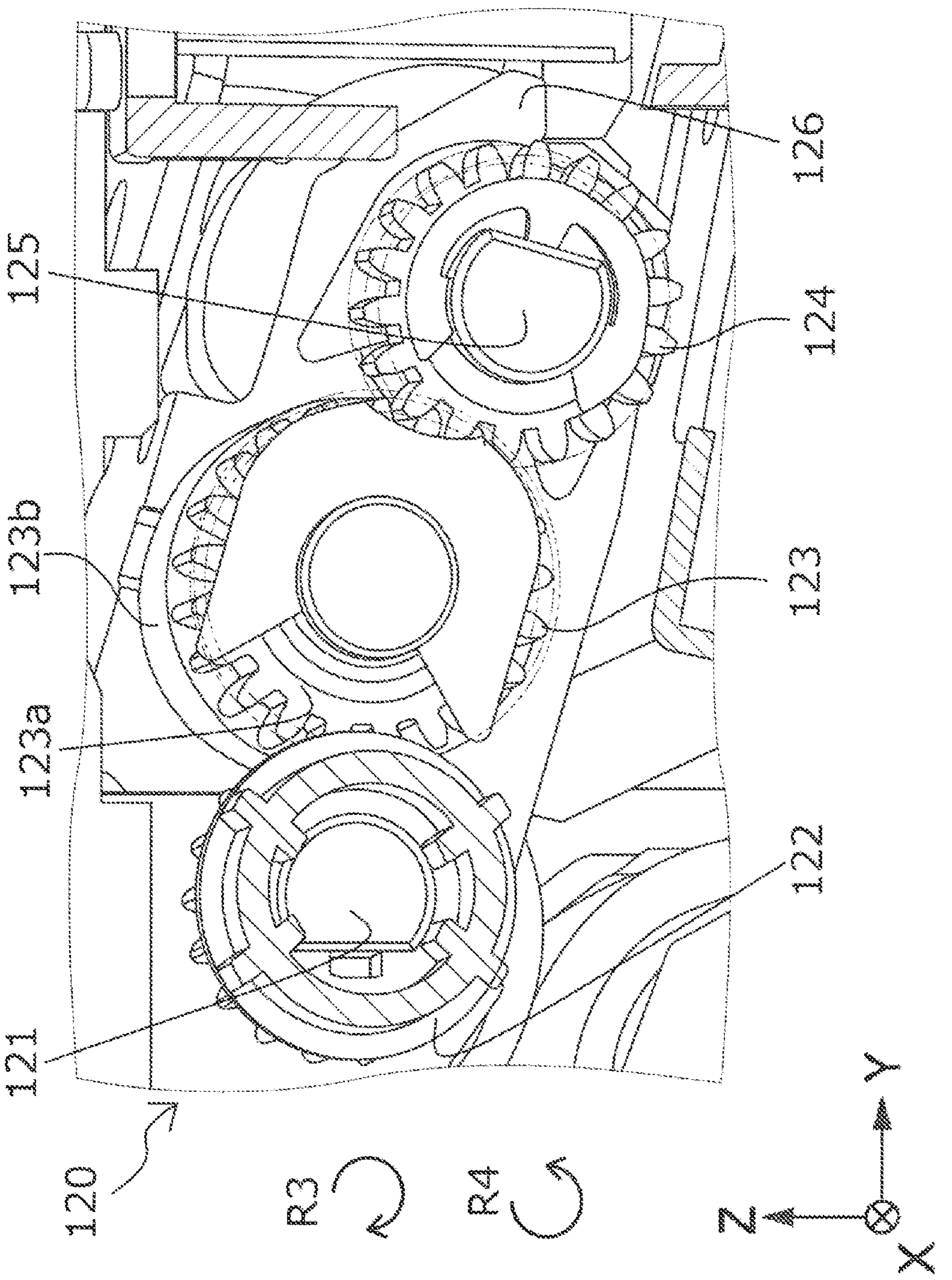
FIG. 8 is a perspective view illustrating a movement mechanism of a pickup roller in the printing device illustrated in FIG. 1, illustrating a state in which the pickup roller is moved in a direction to be brought into contact with the single sheet.
Figure 9:
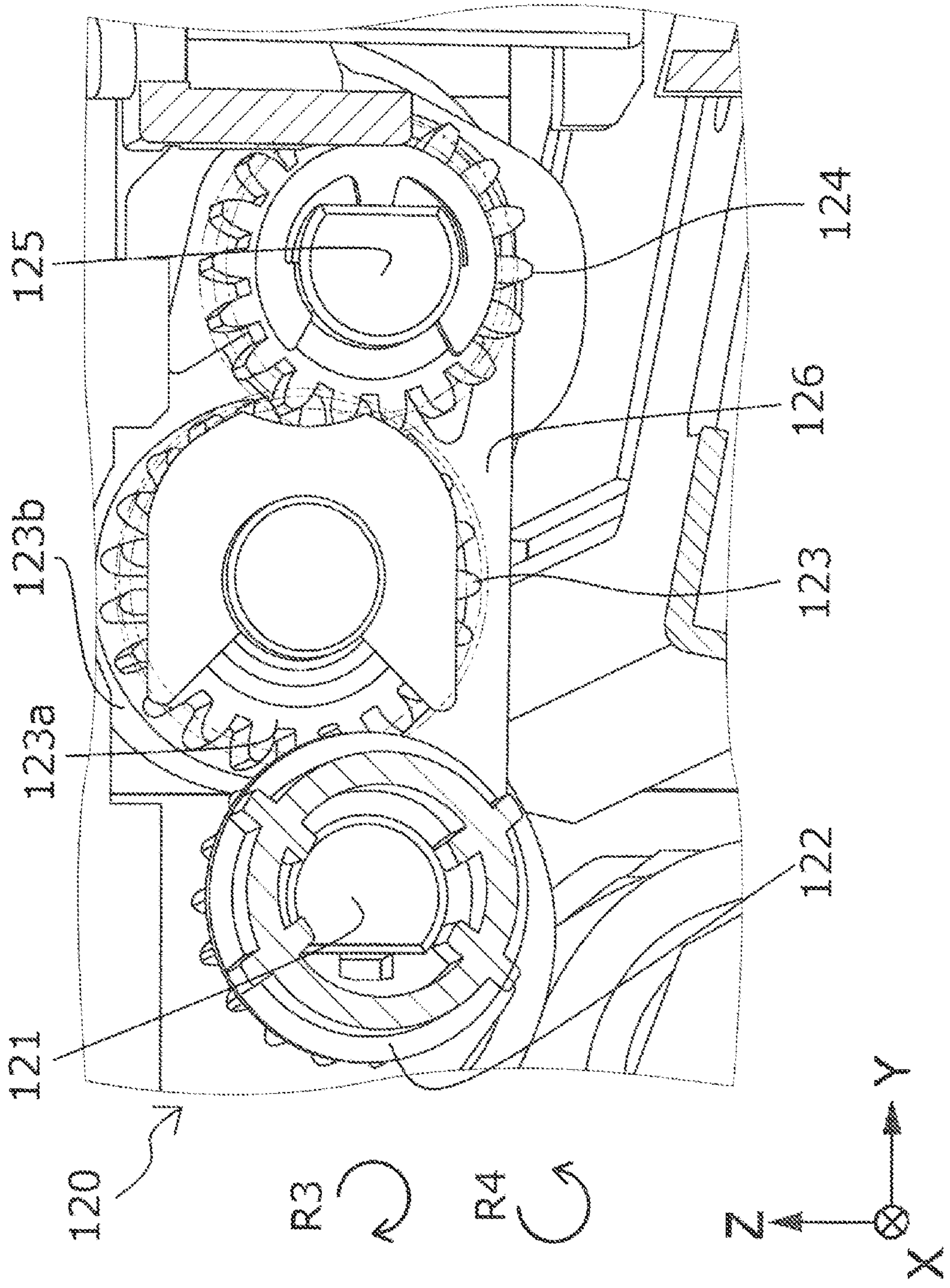
FIG. 9 is a perspective view illustrating the movement mechanism of the pickup roller in the printing device illustrated in FIG. 1, illustrating a state in which the pickup roller is moved in a direction separating from the single sheet.

Here, FIG. 8 is a perspective view illustrating a movement mechanism 120 of the pickup roller 72 in the printing device 11, and illustrates a state in which the pickup roller 72 is moved in a direction in which the pickup roller 72 comes into contact with the single sheet SP. FIG. 9 is a perspective view illustrating the moving mechanism 120 of the pickup roller 72 in the printing device 11, and illustrates a state in which the pickup roller 72 is moved in a direction separating from the single sheet SP. As shown in FIG. 8 and FIG. 9, the moving mechanism 120 includes a rotation shaft 121 to which a rotational force of the motor 100 is transmitted, a gear 122 fitted to the rotation shaft 121 and rotating in a third direction R3 and a fourth direction R4 together with the rotation shaft 121, a gear 123 including a gear portion 123*a* engaged with the gear 122 and a torque limiter portion 123*b*, a gear 124 fitted to a rotation shaft 125 of the pickup roller 72 and engaged with the gear portion 123*a*, and a metal plate portion 126 provided with and integrally moving the gear 122, the gear 123 and the gear 124.

As illustrated in FIG. 8 that corresponds to the state in which the pickup roller 72 is moved in the direction in which the pickup roller 72 is brought into contact with the single sheet SP, when the pickup roller 72 is brought into contact with the single sheet SP in accordance with the preliminary feed operation, the rotation shaft 121 and the gear 122 rotate in the third direction R3. Then, the gear 123 rotates in the fourth direction R4, a torque is applied to the torque limiter portion 123*b*, and a force is applied to the sheet metal portion 126 so as to push down the gear 124. Then, as the gear 123 rotates in the fourth direction R4, the gear 124 and the rotation shaft 125 of the pickup roller 72 rotate in the third direction R3. Here, the third direction R3 corresponds to the rotational direction C1 in FIG. 2 to FIG. 4.

On the other hand, as illustrated in FIG. 9 that corresponds to the state in which the pickup roller 72 is moved in the direction separating from the single sheet SP, when the pickup roller 72 is separated from the single sheet SP in accordance with the non-feed operation, the rotation shaft 121 and the gear 122 rotate in the fourth direction R4. Then, the gear 123 rotates in the third direction R3, a torque is applied to the torque limiter portion 123*b*, and a force is applied to the sheet metal portion 126 so as to push the gear 124 upward. Then, as the gear 123 rotates in the third direction R3, the gear 124 and the rotation shaft 125 of the pickup roller 72 rotate in the fourth direction R4. Here, the fourth direction R4 corresponds to the rotational direction C2 in FIG. 2 to FIG. 4.

The present disclosure is not limited to the above-described examples, and can be realized in various configurations without departing from the spirit of the present disclosure. Further, technical characteristics in the embodiment corresponding to the technical characteristics in each form described in the SUMMARY can be substituted or combined appropriately to solve some or all of the above-described problems, or to achieve some or all of the above-described effects. Further, when the technical characteristics are not described as being essential in the present specification, the technical characteristics can be deleted as appropriate.

What is claimed is:

1. A method of feeding a plurality of single sheet media stacked on a placement unit of a printing device, the feeding being in a transport direction towards printing unit of the printing device, the method comprising:

using a feed roller of the printing device to form a misaligned stacking state of the plurality of single sheet media stacked on the placement unit by repeating a preliminary feed operation and a preliminary non-feed operation a plurality of times before starting the feeding of the medium downstream in the transport direction from the placement unit, the misaligned stacking state being in which a first medium is disposed further downstream, in the transport direction, than the media disposed closer to the placement unit side than the first medium in a stacking direction, the preliminary feed operation being in which the feed roller rotates while in contact with the first medium, and the non-feed operation being in which the first medium does not move downstream in the transport direction, and subsequent to formation of the misaligned stacking state, using the feed roller to feed a first medium downstream in the transport direction from the placement unit.

2. The method according to claim 1, further comprising:

separating the first medium from a remainder of the plurality of single sheet media stacked on the placement unit using a separating roller pair provided downstream of the feed roller in the transport direction, the separation roller pair formed by a separating roller and a retarding roller.

3. The method according to claim 2, further comprising:

using a transport roller positioned downstream of the separating roller in the transport direction to transport the first medium further downstream in the transport direction, and using a drive source to drive each of the feed roller, the separating roller, and the transport roller.

4. The method according to claim 3, comprising the using of the drive source comprising using a driving force transmission member provided between a motor as the drive source and the transport roller, the driving force transmission member rotating the transport roller in a same direction, both when the motor rotates in a first direction and when the motor rotates in a second direction opposite to the first direction.

5. The method according to claim 2, the separating of the first medium further performed using a separating member provided between the feed roller and the separating roller pair in the transport direction, the separating member making sliding contact with a leading end of the first medium fed by the feed roller.

6. The method according to claim 5, wherein the sliding contact of the separating member with the leading end of the first medium being at a recessed portion extending in a width direction of the medium, and the leading end of the medium makes sliding contact with the sliding contact surface.

7. The printing device according to claim 1, wherein during execution of the non-feed operation, the feed roller is separated from the first medium.

8. The method according to claim 5, wherein the feed roller is driven by a motor, the feed roller comes into contact with the first medium and rotates when the motor rotates in a first direction in accordance with the preliminary feed operation, and the feed roller separates from the first medium when the motor rotates in a second direction, opposite to the first direction, in accordance with the non-feed operation.

9. The method according to claim 1, wherein the non-feed operation is at least one of 1) separation of the feed roller from the first medium, 2) rotation of the of feed roller in opposite direction to when the feed roller feeds the first media, and 3) stopping of the feed roller.

* * * * *